Patented Feb. 20, 1934

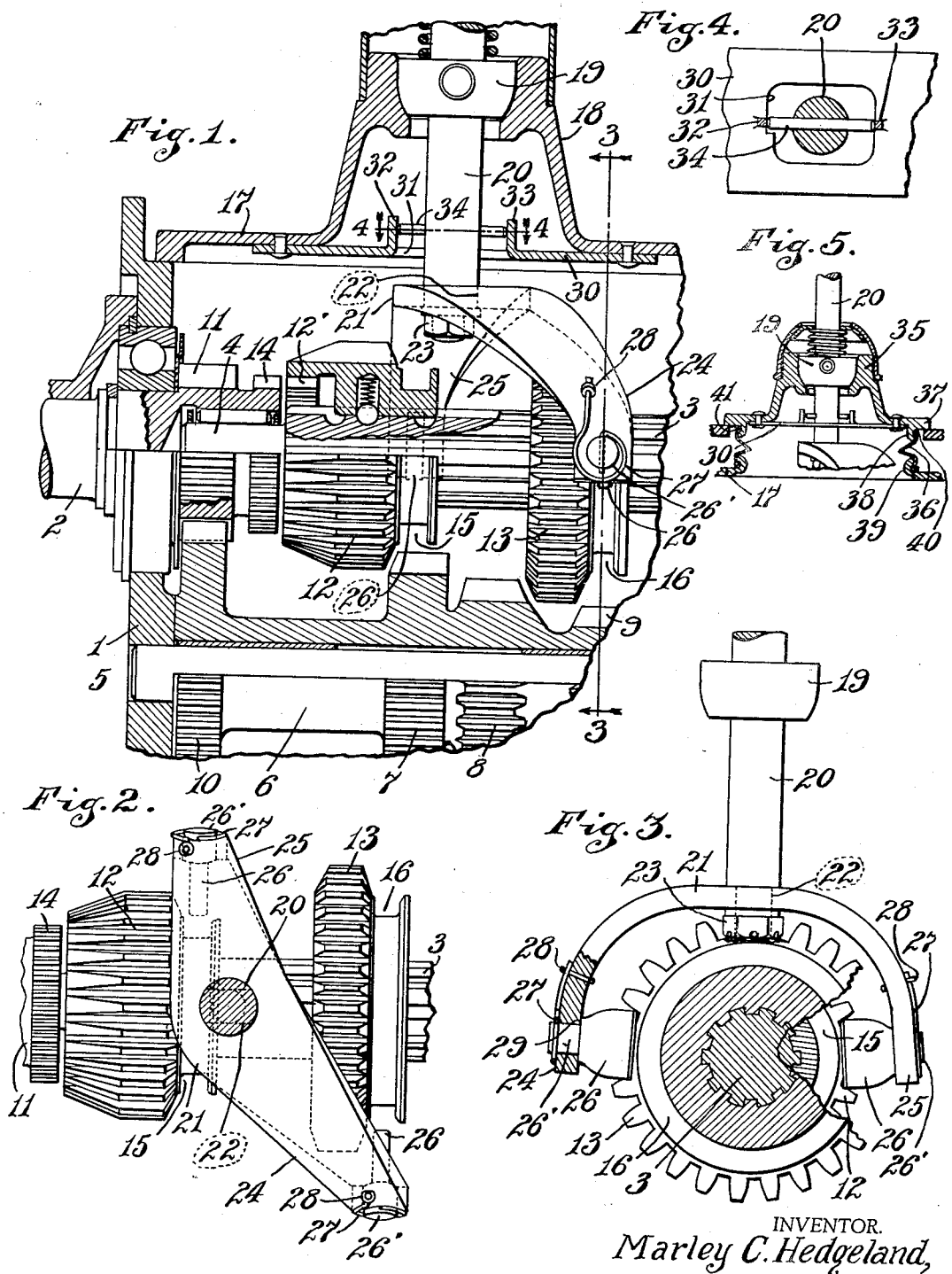

1,947,988

UNITED STATES PATENT OFFICE 1,947,988

SHIFT LEVER

Marley C. Hedgeland, Muncie, Ind., assignor to Warner Gear Company, Muncie, Ind., a corporation of Indiana Application November 14, 1932
Serial No. 642,562

13 Claims. (Cl. 74—39)

My invention relates to improvements in shifting mechanism for automobile transmissions and particularly to the shift lever and parts operated thereby.

It has for one of its objects the provision of means whereby the usual shift rods, carrying the shifting forks for the different sliding gears or clutches may be dispensed with.

For the purpose of disclosing my invention I have illustrated certain embodiments thereof in the accompanying drawing in which Fig. 1 is a longitudinal section of a transmission embodying my invention; Fig. 2 is a detail plan of the lower end of the shifting yoke; Fig. 3 is a sectional view on the line 3—3 of Fig. 1; Fig. 4 is a detail plan of the shift lever guiding means and Fig. 5 is a view showing a modification of my invention.

For the purpose of disclosing my invention I have shown the same embodied in a transmission of the sliding gear type. In this type of transmission the usual housing 1 is provided into which projects and is supported by ball bearings, the driving shaft 2 and the driven shaft 3, the driven shaft 3 being piloted as at 4 in a recess end of the driving shaft 2. The usual jack shaft 5 is provided, having mounted thereon a sleeve or spindle 6 provided with the second speed gear 7, the low speed gear 8 and the reverse gear 9. This spindle is driven through the medium of a gear 10 meshing with a gear 11 mounted on the drive shaft 2.

The speed changes are effected by means of the sliding gears 12 and 13 splined on the shaft 3. The sliding gear 12 is adapted to mesh with the gear 7 for second speed drive and is provided with internal clutch teeth 12' for engagement with the clutch teeth 14 on the shaft 2 for direct drive. The sliding gear 13 is adapted to mesh with the gear 8 for low speed drive and to be driven through an idler gear (not shown) by gear 9 for reverse drive.

The gears 12 and 13 are provided respectively with annular grooves 15 and 16 for the reception of the shifting mechanism.

The top 17 is provided with a substantially-truncated cone-shaped extension 18 in which is universally mounted as at 19 the shift lever 20. This shift lever carries at its lower end a shifting yoke 21 which may be stamped, if desired, from sheet metal and is secured to the lower portion 22 of the shift lever, which portion has its sides flattened and extends through a corresponding opening in the yoke 21. A nut 23, or other securing means, is provided for retaining the yoke in position. This yoke is of a rather peculiar shape. It arches down on either side of the driven shaft 3 and one arm 24 thereof is considerably to the rear of the other arm 25 so that the ends of the arms occupy different positions longitudinally of the shaft 2 to position them respectively opposite the grooves 15 and 16 of the sliding gears, when these sliding gears are in neutral position, and the shift lever is in neutral position. The lower end of each of the arms carries an engaging finger 26 flattened on its sides and sufficiently thin in cross-section to take into the grooves 15 and 16. The supporting end of the finger is rounded as at 26' and engages in a rounded opening in the end of the yoke arm. A coiled spring 27 has one end engaging in an opening extending through the portion 26' of the finger and its opposite end engaging in an ear 28. Due to the fact that the finger is provided with a shoulder 29 this manner of mounting effectually holds the finger in position in the arm and at the same time permits a rotation of the finger, insuring, however, the return of the finger to its normal position.

In order to guide the shift arm and its yoke a plate 30 is secured to the under face of the top 17 and is provided with an opening 31 therethrough. The end walls of the recess intermediate of the side thereof are provided with upturned lugs or stops 32 and 33 adapted when the shift lever is in neutral position to receive between the same a pin 34 extending through the shift lever 20 or other projecting members extending back and forth from the lever. This arrangement prevents a shifting of the lever when in neutral position and when the lever is swung to either engaging position, right or left of the center line, the pin sliding along the sides of the stops 32 or 33 maintains the lever in its transverse shifted position during its forward or back movement.

The operation of the structure is clear. In order to shift into low the upper end of the lever is, as is usual in standard gear shift, moved to the left. This, of course, will swing the shifting finger on the arm 24 into the groove 16. Then by moving the upper end of the lever rearwardly the gear 13 is moved into mesh with the gear 8, thereby establishing low speed drive. During this movement the pin 34 in engagement on the side of the stop 32 will guide the lever and yoke and prevent the shifting finger from moving out of the groove 16. A reverse movement of the shift lever will, of course, mesh the gears in reverse drive. In order to move into high or second speed gear the lever is shifted to the right, which, of course will engage the shifting finger on the arm 25 in the recess 15, thereby permitting the shift of the gear 12 either rearwardly or forwardly in event it is desired to drive in second or high speed. Due to the fact that the pins 26 are rotatably mounted in the arms 25 and 24 a broad bearing surface is provided by the pins and at the same time these pins will rotate to accommodate themselves to the change in angular relation between the arms and the gears.

However, under the influence of the spring the arms are always biased to normal position.

The structure is particularly applicable for use in that type of automobile drive wherein the power units, including the transmissions, are flexibly mounted so that the torsional movements of the power shafts have a tendency to slightly rotate the transmission unit. Heretofore in such structures the connection between the shift lever and the transmission members has been such that the rocking action of the transmission carries the control or shift lever around to such an extent as to cause an appearance to the driver of an alarming amount of movement on the part of the control lever. In order to avoid the transmission of the movement of the transmission proper to the shift lever, the shift lever mounting 35 may be mounted on a separate support, see Fig. 5. This mounting carries the shift lever 20 as well as the shift lever guide plate 30. A flexible boot or closure member 36 extends between the base 37 of the shift lever mounting and the top 17 of the transmission casing to permit of a relative movement between the casing and the shift lever mounting. This boot serves to exclude dirt or other foreign matter from the transmission and prevents the splashing out from the transmission of the oil. One arrangement for securing this boot in position consists of an annular flange 38 on the mounting 37 and a similar flange 39 on the top 17 of the transmission casing. The boot 36 surrounds these two flanges and is maintained in position by securing rings 40 extending in suitable grooves 41 formed in the flanges. It is therefore apparent that any bodily shifting movement on the part of the transmission and transmission housing will not be imparted to the shift lever, especially as any rotative movement thereof will permit a relative movement between the shift forks and the shift gears.

I claim as my invention:

1. In a transmission, the combination with a pair of independently axially shiftable interengageable transmission members, of a shift lever therefor and means carried by the lower end of said lever extending on opposite sides of said shiftable members and selectively movable into operable engagement with said shiftable members by a transverse movement of the lever and movable to axially shift said members by a longitudinal movement of the lever.

2. In a transmission, the combination with a pair of axially independently shiftable interengageable transmission members, of a shift lever therefor, means carried by the lower end of said lever extending on opposite sides of said shiftable members and selectively movable into operable engagement with said shiftable members by transverse movement of the shift lever and movable to axially shift said members by longitudinal movement of said lever and means for preventing a longitudinal shift of the lever except when said means is engaged with one of said shiftable members.

3. In a transmission, the combination with a pair of axially independently shiftable interengageable transmission members, of a shift lever therefor, means carried by the lower end of said shift lever extending on opposite sides of said shiftable members and selectively movable into operable engagement with said shiftable members by transverse movement of the lever and movable to axially shift said members by a longitudinal movement of the lever and means for maintaining said first-mentioned means in engagement during the shifting movement.

4. In a transmission, the combination with a pair of axially independently shiftable interengageable transmission members, of a shift lever therefor, a pair of arms supported on the lower end of said lever extending on opposite sides of said shiftable members and having means selectively movable into operable engagement with said members by a transverse movement of the lever and movable to shift the members by a longitudinal movement of the lever.

5. In a transmission, the combination with a pair of axially independently shiftable interengageable transmission members, of a shift lever therefor, a pair of arms supported on the lower end of said lever extending on opposite sides of said shiftable members and having means selectively movable into operative engagement with said members by a transverse movement of the lever and movable to shift the members by a longitudinal movement thereof and means for maintaining said engagement during the shifting movement of the lever.

6. In a transmission, the combination with a pair of axially independently shiftable interengageable transmission members, of a shift lever therefor, a pair of arms supported on the lower end of said shift lever extending on opposite sides of said shiftable members and having means selectively movable into operable engagement with said members by a transverse movement of the lever and movable to shift the members by longitudinal movement of the lever and means for preventing a disengagement of said first-mentioned means except when the shiftable members are in neutral position.

7. In a transmission, the combination with a pair of axially independently shiftable interengageable transmission members, of a shift lever therefor, a pair of arms supported on the lower end of said lever extending on opposite sides of said shiftable members and having means rotatably mounted on said arms and selectively movable into operative engagement with said members by a transverse movement of the shift lever and movable to shift the members by a longitudinal movement thereof.

8. In a transmission, the combination with a pair of axially independently shiftable interengageable transmission members, of a shift lever therefor, a pair of arms supported on the lower end of said shift lever extending on opposite sides of said shiftable members, means rotatably mounted in said arms, selectively movable into operable engagement with said members by a transverse movement of the lever and movable to shift the members by longitudinal movement thereof and means biasing said rotatable means in their normal position.

9. In a transmission, the combination with a pair of axially independently shiftable interengageable transmission members, of a shift lever therefor, a yoke supported on said shift lever having downwardly-extending arms spaced apart longitudinally and disposed on opposite sides of the shiftable members and having means selectively movable into operative engagement with said members by a transverse movement of the lever and movable to shift the members by longitudinal movement thereof.

10. In a transmission, the combination with a shaft, of a pair of independently shiftable transmission members mounted on said shaft and shiftable axially thereof, each having an annular engaging portion, of a shift lever mounted above said shaft, a yoke supported on said shift lever having a pair of arms extending downwardly on opposite sides of the shaft and longitudinally spaced apart and means on said arms movable into shiftable engagement with said annular engaging portions of said shiftable members by transverse shift of said lever and movable to shift said members by longitudinal movement thereof.

11. In a transmission, the combination with a shaft, of a pair of independently shiftable transmission members mounted on said shaft and shiftable axially thereof, each having an annular engaging portion, of a shift lever mounted above said shaft, a yoke supported on said shift lever having a pair of arms extending downwardly on opposite sides of the shaft and longitudinally spaced apart, means on said arms movable into shiftable engagement with said annular engaging portions of said shiftable members by transverse shift of said lever and movable to shift said members by longitudinal movement thereof, and means for preventing longitudinal shift of a lever except when one of said engaging means is in engaging position, and for maintaining said engaging means in engaging position during the shifting movement of the lever.

12. In a transmission, the combination with a casing, of axially independently shiftable interengageable transmission members within said casing, a shift lever therefor, means carried by the lower end of said lever extending on opposite sides of said shiftable members and selectively movable into operable engagement with said shiftable members by a transverse movement of the shift lever and movable to axially shift said member by a longitudinal movement of said lever, and a mounting for said lever independent of said casing.

13. In a transmission, the combination with a casing, of axially independently shiftable interengageable transmission members in said casing, a shift lever therefor, means carried by the lower end of said lever extending on opposite sides of said shiftable members and selectively movable into operable engagement with said shiftable members by a transverse movement of the shift lever and movable to axially shift said members by longitudinal movement of said lever, a mounting for said lever independent of said casing, and a flexible closure connection between said mounting and said casing.

MARLEY C. HEDGELAND.